United States Patent
McNealy et al.

(10) Patent No.: US 10,480,159 B2
(45) Date of Patent: Nov. 19, 2019

(54) KINETIC ENERGY RECOVERY SYSTEM FOR A MACHINE

(71) Applicant: Caterpillar Inc., Peoria, IL (US)

(72) Inventors: Anthony Dean McNealy, Dunlap, IL (US); Corey Lee Gorman, Peoria, IL (US); Shogo Tada, Peoria, IL (US); Rustin Glenn Metzger, Congerville, IL (US); Hideki Nakajima, Peoria, IL (US); Justin Douglas Speichinger, Edwards, IL (US); Shinya Ohmura, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 41 days.

(21) Appl. No.: 15/613,987

(22) Filed: Jun. 5, 2017

(65) Prior Publication Data

US 2018/0347152 A1     Dec. 6, 2018

(51) Int. Cl.
*B60K 6/10*     (2006.01)
*E02F 9/22*     (2006.01)
*F15B 21/14*     (2006.01)

(52) U.S. Cl.
CPC .......... *E02F 9/2217* (2013.01); *F15B 21/14* (2013.01); *B60K 6/10* (2013.01); *B60K 6/105* (2013.01); *F15B 2211/205* (2013.01); *F15B 2211/20515* (2013.01); *Y02T 10/6204* (2013.01)

(58) Field of Classification Search
CPC ...... Y02T 10/6204; B60K 6/10; B60K 6/105; B60K 6/30
See application file for complete search history.

(56) References Cited

U.S. PATENT DOCUMENTS

| | | | | |
|---|---|---|---|---|
| 4,484,083 A | * | 11/1984 | Jefferies | B60K 6/105 180/65.245 |
| 4,625,823 A | * | 12/1986 | Frank | B60K 6/105 180/165 |
| 4,679,646 A | * | 7/1987 | Greenwood | B60K 6/105 180/165 |
| 4,888,949 A | * | 12/1989 | Rogers | B60K 6/105 180/165 |
| 6,668,953 B1 | * | 12/2003 | Reik | B60K 6/08 180/165 |
| 7,043,906 B2 | | 5/2006 | Suzuki et al. | |
| 9,162,560 B2 | * | 10/2015 | Jacobson | B60W 10/24 |

(Continued)

*Primary Examiner* — James A Shriver, II
*Assistant Examiner* — Vaughn Coolman
(74) *Attorney, Agent, or Firm* — Miller, Matthias & Hull

(57) ABSTRACT

A kinetic energy recovery system (KERS) for a machine having a swing motor and/or an actuator includes a hydraulic motor/pump that can output pressurized fluid for operating at least one of: the swing motor and the actuator. A first shaft of the hydraulic motor/pump can be rotated by fluid returning from at least one of: the swing motor and the actuator back to the hydraulic motor/pump. Further, the KERS also includes a flywheel that can selectively couple with the first shaft with the help of a first clutch. The flywheel stores drive power generated by the hydraulic motor/pump from the return flow of fluid when the first clutch couples the flywheel with the first shaft of the hydraulic motor/pump. A gearing arrangement is coupled to the flywheel and can selectively engage with a second shaft associated with a prime mover of the machine with the help of a second clutch.

19 Claims, 2 Drawing Sheets

(56) References Cited

U.S. PATENT DOCUMENTS

| | | | | |
|---|---|---|---|---|
| 9,746,051 | B2* | 8/2017 | Murata | F16F 15/31 |
| 2007/0175209 | A1* | 8/2007 | Smith | E02F 9/2217 |
| | | | | 60/414 |
| 2007/0186548 | A1* | 8/2007 | Smith | E02F 9/2217 |
| | | | | 60/413 |
| 2014/0045651 | A1* | 2/2014 | Jacobson | B60K 6/105 |
| | | | | 477/70 |
| 2014/0046538 | A1* | 2/2014 | Siegel | G05B 11/32 |
| | | | | 701/36 |
| 2014/0103761 | A1* | 4/2014 | Atkins | B60K 6/105 |
| | | | | 310/74 |
| 2015/0027109 | A1* | 1/2015 | Cottingham | B60W 10/24 |
| | | | | 60/327 |
| 2016/0001762 | A1* | 1/2016 | He | B60W 10/101 |
| | | | | 701/22 |

\* cited by examiner

KINETIC ENERGY RECOVERY SYSTEM FOR A MACHINE

TECHNICAL FIELD

The present disclosure relates to a kinetic energy recovery system (KERS) for a machine. More particularly, the present disclosure relates to a KERS for a machine having at least one of a swing motor and an actuator.

BACKGROUND

Machines used for commercial, work, or other similar applications may be characterized as having a larger weight and size, particularly in comparison to personal machines, and may actuate relatively large and heavy components in operation. As a result, the operation of such machines may require a substantial amount of energy, which thus involves the consumption of a substantial amount of fuel, in some cases. Given the amount of fuel that may be required for the operation of such machines, the recovery or conservation of energy may be advantageous. However, recovery or conservation of energy may be difficult given the weight, size, and/or complexity of such machines as well as the variety and/or complexity of operations such machines perform.

Previously known designs of systems for capturing and reusing the energy in such machines have typically included one or more fluid accumulators. For instance, U.S. Pat. No. 7,043,906 discloses the use of such a fluid-based accumulator system for capturing and reusing the energy in a machine. However, given the size of sonic of such fluid accumulators, their use may not be suited to certain applications.

Hence, there is an energy recovery system that is configured to overcome the aforementioned shortcomings.

SUMMARY OF THE DISCLOSURE

In an aspect of the present disclosure, a machine includes a frame, a body mounted on the frame and having a prime mover disposed therein, a swing motor configured to operably rotate the body relative to the frame, a linkage pivotally mounted on the body, and an actuator configured to operably pivot the linkage relative to the body. The machine further includes a kinetic energy recovery system (KERS) that is operable to selectively receive drive power from a hydraulic motor/pump disposed in fluid communication with the swing motor and the actuator of the machine, and selectively transfer the stored drive power to the prime mover in driving the swing motor and the actuator.

In one aspect of the present disclosure, the kinetic energy recovery system (KERS) includes a hydraulic motor/pump. The hydraulic motor/pump is disposed in fluid communication with a fluid source via a fluid source conduit. The hydraulic motor/pump is configured to output pressurized fluid via a hydraulic motor/pump conduit for operating at least one of: the swing motor and the actuator associated with the machine. A first shaft associated with the hydraulic motor/pump is configured to be operatively rotated by a flow of fluid returning from at least one of the swing motor and the actuator back to the fluid source via the hydraulic motor/pump.

Further, the KERS also includes a flywheel that is configured to selectively couple with the first shaft of the hydraulic motor/pump with the help of a first clutch. The flywheel is configured to store drive power generated by the hydraulic motor/pump from the return flow of fluid when the first clutch couples the flywheel with the first shaft of the hydraulic motor/pump.

Furthermore, the KERS also includes a gearing arrangement coupled to the flywheel. The gearing arrangement is also configured to selectively engage with a second shaft associated with the prime mover of the machine. The gearing arrangement can be selectively engaged to the second shaft with the help of a second clutch. The first clutch is selectively operable for facilitating a transfer of drive power from the first shaft of the hydraulic motor/pump to the flywheel, and the second clutch is selectively operable for transferring stored drive power from the flywheel to the second shaft associated with the prime mover.

In another aspect of this disclosure, the KERS includes a hydraulic motor/pump disposed in fluid communication with a fluid source via a fluid source conduit. The hydraulic motor/pump is configured to output pressurized fluid via a hydraulic motor/pump conduit for operating at least one of: the swing motor and the actuator associated with the machine. A first shaft associated with the hydraulic motor/pump is configured to be operatively rotated by a flow of fluid returning from at least one of: the swing motor and the actuators back to the fluid source via the hydraulic motor/pump.

Further, the KERS also includes a gearing arrangement that is configured to selectively couple with the first shaft of the hydraulic motor/pump with the help of a first clutch, and a flywheel that is coupled to the gearing arrangement. The flywheel is configured to store drive power generated by the hydraulic motor/pump from the return flow of fluid when the first clutch couples the gearing arrangement with the first shaft of the hydraulic motor/pump.

Furthermore, the KERS also includes a second clutch disposed between the gearing arrangement and a second shaft associated with the prime mover of the machine for selectively coupling the gearing arrangement with the second shaft. The first clutch is selectively operable for facilitating a transfer of drive power from the first shaft of the hydraulic motor/pump to the flywheel via the gearing arrangement, and the second clutch is selectively operable for transferring stored drive power from the flywheel to the second shaft via the gearing arrangement.

Other features and aspects of this disclosure will be apparent from the following description and the accompanying drawings.

DETAILED DESCRIPTION

Figure 1:
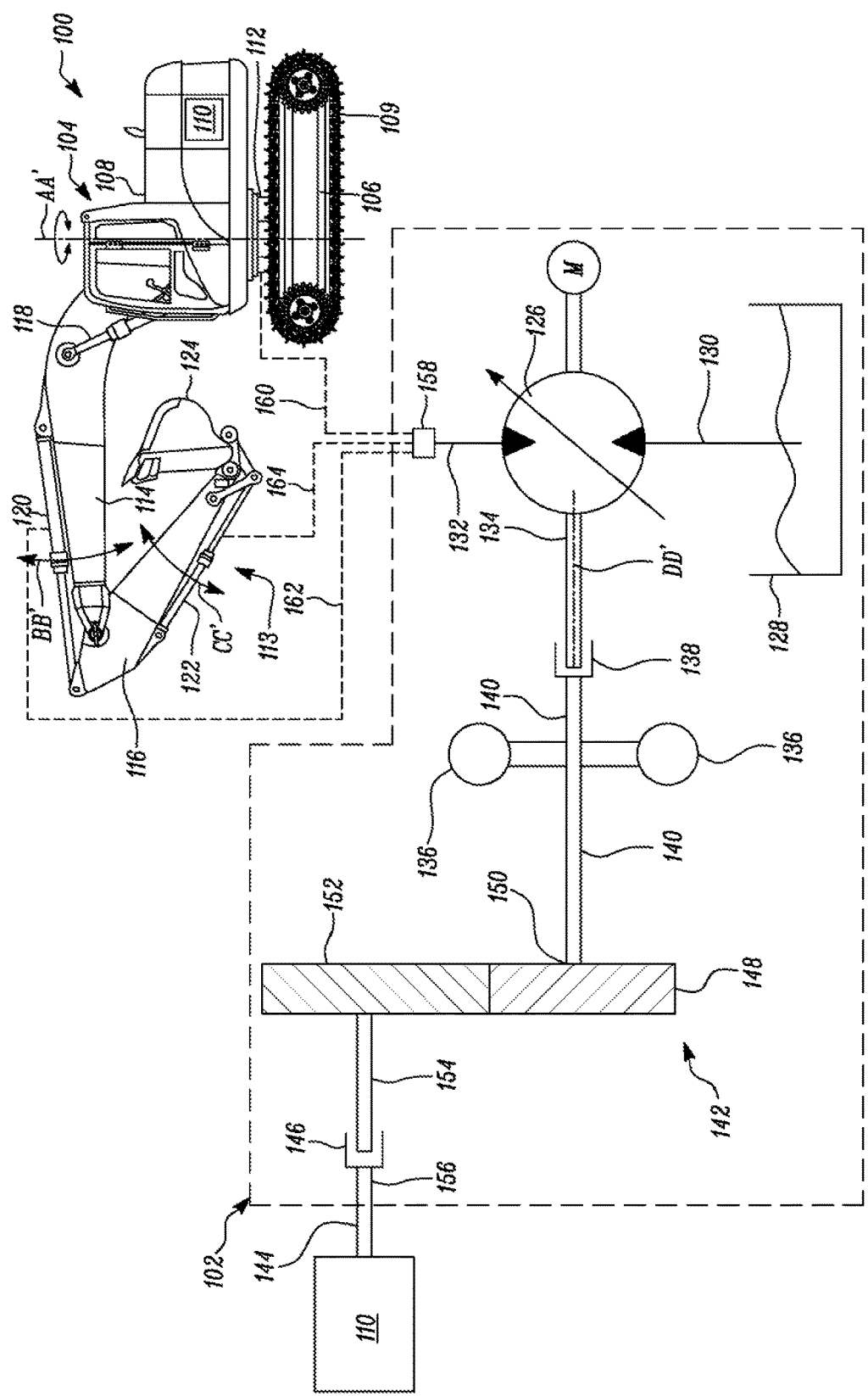
FIG. 1 is a side diagrammatic view of a machine showing a schematic of a kinetic energy recovery system (KERS) that can be employed by the machine, in accordance with an embodiment of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

The present disclosure relates to a kinetic energy recovery system (KERS) for a machine having a swing motor and/or an actuator therein. FIG. 1 shows a machine 100 and a kinetic energy recovery system (KERS) 102 that can be employed by the machine 100 in accordance with an embodiment of the present disclosure.

Referring to FIG. 1, the machine 100 is embodied in the form of an excavator which is particularly denoted by numeral '104'. However, it may be noted that the excavator 104 disclosed herein is non-limiting of this disclosure. It will be appreciated that embodiments of this disclosure can be similarly applied to other types of machines having at least one of a swing motor and an actuator. Some examples of such machines could include a backhoe loader, a wheel loader, an articulated truck, and other types of machines known to persons skilled in the art.

As shown in FIG. 1, the machine 100 includes a body 108 mounted on or supported by one or more ground engaging traction and/or propulsion members 109 (and an associated system) for movement of the machine 100. In an exemplary embodiment as shown in FIG. 1, the machine 100 is embodied as an excavator 104. In this embodiment, the body 108 of the excavator 104 is mounted on a frame 106 that is embodied in the form of a tracked undercarriage. The excavator 104 also has a prime mover 110 shown as being disposed within the body 108, and additionally depicted as being operatively associated with and located within the schematic of the KERS 102 implemented by the machine 100. In an embodiment, the prime mover 110 may include, or may be embodied as an internal combustion engine, for example, a diesel engine. Alternatively, in another embodiment, the prime mover 110 may be embodied as a hydraulic pump that is in turn driven by an internal combustion engine. In other embodiments, the prime mover 110 can be embodied as any other type of prime mover known to persons skilled in the art including, for example, an electric motor, or a hydraulic pump that is driven by an electric motor. It will be appreciated that a type and configuration of the prime mover 110 disclosed herein is non-limiting of this disclosure. Rather, the type and configuration of the prime mover 110 used in a given machine would depend on a type of the machine used and various other requirements associated with an application.

The excavator 104 also includes a swing motor 112 that is configured to operably rotate the body 108 relative to the frame 106. As shown, the swing motor 112 can operatively rotate the body 108 relative to the frame 106 about an axis AA'. The swing motor 112 disclosed herein may be a hydraulically operated motor. Further, as shown, the excavator 104 also includes a pair of linkages 113, which in this case, include—a boom 114 and a stick 116. The boom 114 is pivotally mounted to the body 108 and can pivot in the direction BB' relative to the body 108. The stick 116 is pivotally mounted to the boom 114 and can pivot in the direction CC' relative to the boom 114.

As shown, the excavator 104 also includes multiple actuators—a pair of first actuators 118, a second actuator 120, and a third actuator 122. Although only one of the pair of first actuators 118 is shown in FIG. 1, it is to be understood that each of the pair of first actuators 118 may be disposed and extendably/retractably mounted on opposing sides of the boom 114 and may be attached at opposing ends of the boom and the body 108 such that the pair of first actuators 118 are configured to operably pivotally raise or lower the boom 114 relative to the body 108. The second actuator 120 is configured to operably pivot the stick 116 relative to the boom 114. The third actuator 122 is configured to operably pivot a work implement 124, for example, a bucket, with respect to the stick 116 of the machine 100. It may be noted that each of the first, second and third actuators 118-122 disclosed herein are embodied in the form of hydraulic actuators. Moreover, it may be noted that although three actuators 118-122 are disclosed in conjunction with the excavator 104 herein, a number of actuators used may vary depending on various factors including, but not limited to, a type of machine used, a number of moving linkages associated with the machine, and other specific requirements of an application.

With continued reference to FIG. 1, the KERS 102 employed by the machine 100 is operable to selectively receive drive power from a hydraulic motor/pump 126 that is disposed in fluid communication with the swing motor 112 and each of the actuators 118-122 present on the excavator 104. It may be noted that although the hydraulic motor/pump 126 is embodied as a variable displacement hydraulic motor/pump in the illustrated embodiment of FIG. 1, persons skilled in the art can contemplate to alternatively implement a fixed displacement hydraulic motor/pump in lieu of the variable displacement hydraulic motor/pump disclosed herein.

Moreover, the KERS 102 of the present disclosure can also selectively transfer the stored drive power to the prime mover 110 in driving the swing motor 112 and the actuators 118-122. Further explanation to the KERS 102 will be made hereinafter.

In the embodiment shown in FIG. 1, the KERS 102 includes a hydraulic motor/pump 126. The hydraulic motor/pump 126 is disposed in fluid communication with a fluid source 128, for example, a tank via a fluid source conduit 130 connected and extending in fluid communication between the hydraulic motor/pump/pump 126 and the fluid source 128. The hydraulic pump/motor 126 is connected in fluid communication to supply and receive pressurized fluid via a hydraulic motor/pump conduit 132. The hydraulic motor/pump conduit 132 is connected and fluidly extending between the hydraulic pump/motor 126 and a valve 158 connecting the hydraulic pump/motor 126 to receive and supply hydraulic energy in the form of pressurized hydraulic fluid from and to, respectively, one or more of the swing motor 112 and the actuators 118-122 associated with the machine 100.

As further shown in FIG. 1, the valve 158 can be operated to selectively permit flow from the hydraulic motor/pump conduit 132 to one or more of the swine motor 112 and the actuators 118-122 via conduits 160, 162, and 164 respectively when the hydraulic pump/motor 126 is actuated as a hydraulic pump. Additionally, this valve 158 can also be operated to selectively permit a return flow of fluid from one or more of the swing motor 112 and the actuators 118-122 to the hydraulic motor/pump conduit 132 via conduits 160, 162, and 164 respectively when the hydraulic pump/motor 126 is actuated as a hydraulic motor. In embodiments of this disclosure, it may be noted that in one mode of operation, fluid can be supplied from the hydraulic pump/motor 126 to the swing motor 112 and/or the actuators 118-122 via the hydraulic motor/pump conduit 132 when the hydraulic pump/motor 126 is actuated as a hydraulic pump and in another mode of operation hydraulic energy in the form of pressurized hydraulic fluid can be fluidly delivered or supplied to the hydraulic pump/motor 126 via the hydraulic motor/pump conduit 132 when the hydraulic pump/motor 126 is actuated as a hydraulic motor.

The hydraulic motor/pump 126 includes a first shaft 134 operably and mechanically attached thereto in mutual rotation with the hydraulic motor/pump 126 and is configured to convert and transfer hydraulic energy between the hydraulic motor/pump 126 and, in part, a flywheel 136, as further discussed herein. When fluid from the swing motor 112 and/or the actuators 118-122 returns to the fluid source 128 via the hydraulic motor/pump 126, the first shaft 134 associated with the hydraulic motor/pump 126 can rotate under the influence of fluid turning one or more rotating components (not shown) of the hydraulic motor/pump 126 to which the first shaft 134 may be rigidly attached.

As further shown in the embodiment of FIG. 1, the KERS 102 also includes a flywheel 136 that is configured to selectively couple with the first shall 134 of the hydraulic motor/pump 126 with the help of a first clutch 138. The first clutch 138 is selectively operable for facilitating a transfer of drive power from the first shaft 134 of the hydraulic motor/pump 126 to the flywheel 136. In this embodiment, the flywheel 136 is mounted on a first intermediary shaft 140 that is co-located with the first shaft 134 and is configured to support, at least in part, the first clutch 138 thereon. Therefore, when the first clutch 138 couples the flywheel 136 with the first shaft 134 of the hydraulic motor/pump 126, the flywheel 136 is configured to store drive power generated by the hydraulic motor/pump 126 from the return flow of fluid passing through the hydraulic motor/pump 126.

Furthermore, the KERS 102 also includes a gearing arrangement 142 coupled to the flywheel 136. The gearing arrangement 142 is configured to selectively engage with a second shaft 144 associated with the prime mover 110 of the machine 100. The gearing arrangement 142 can be selectively engaged to the second shaft 144 with the help of a second clutch 146. The second clutch 146 is selectively operable for transferring stored drive power from the flywheel 136 to the second shaft 144 associated with the prime mover 110.

The first and second clutches 138, 146 may be mechanically operated, hydro-mechanically operated clutches, or electronically operated clutches depending on specific requirements of an application. In an example, each of the first and second clutches 138, 146 may be a 1-way sprag clutch. In another example, the first clutch 138 may be a 1-way sprag clutch while the second clutch 146 may be embodied in the form of a mechanical diode as known to persons skilled in the pertinent art. It may also be noted that that each of the first and second clutches 138, 146 disclosed herein are operable selectively and hence, the first and second clutches 138, 146 are operable independently of one another.

As shown in the illustrated embodiment of FIG. 1, the gearing arrangement 142 includes a first gear wheel 148 that is rigidly mounted to an end 150 of the first intermediary shaft 140. The gearing arrangement 142 also includes a second gear wheel 152 that is disposed in rotatable engagement with the first gear wheel 148. Also, the second gear wheel 152 is mounted on a second intermediary shaft 154 that is co-located with the second shaft 144 associated with the prime mover 110. An end 156 of the second shaft 144 is configured to support, at least in part, the second clutch 146 thereon. Therefore, the second clutch 146 can be selectively operated to couple the second shaft 144 with the second intermediary shaft 154.

During operation of the machine 100, the hydraulic motor/pump 126 draws fluid at a low pressure from the fluid source 128 through the fluid source conduit 130. The hydraulic motor/pump 126 increases a pressure of the drawn fluid to supply this fluid at an elevated pressure for actuating movement of the swing motor 112 and/or the actuators 118-122 and causing movement of the body 108 relative to the frame 106 and/or the linkages 113 relative to the body 108 respectively.

When the body 108 and/or the linkages 113, should be returned to their respective original positions, fluid from the swing motor 112 and/or the actuators 118-122 is caused, by appropriate valve control arrangements (not shown), to return to the fluid source 128 via the hydraulic motor/pump 126. The first shaft 134, provided to the hydraulic motor/pump 126, is caused to turn about its axis DD' by the effect of the returning fluid turning one or more rotating components (not shown) present in the hydraulic motor/pump 126. This rotation of the first shaft 134 can be regarded as a manifestation of the drive power that is recovered from the fluid when the fluid returns from the swing motor 112 and/or the actuators 118-122 to the hydraulic motor/pump 126.

At this point, if the first clutch 138 is operated to couple the first intermediary shaft 140 with the first shaft 134, the flywheel 136 rotates to cause rotation of the first gear wheel 148. The flywheel 136 disclosed herein has a high amount of inertia, owing to its high mass that is selected beforehand based on various specific requirements of an application and/or various operating parameters that are to be taken into consideration. The high moment of inertia possessed by the flywheel 136 helps the flywheel 136 to store the drive power therein. The drive power may be stored at the flywheel 136 for a finite amount of time, for example, until the momentum of the flywheel 136 decays owing to its high mass.

Due to rotation of the flywheel 136 together with the first intermediary shaft 140, the first gear wheel 148 which is mounted on the first intermediary shaft 140 also rotates. This causes rotation of the second gear wheel 132 and the second intermediary shaft 154. When power output from the prime mover 110 is to be optimized, for example, to reduce fuel consumption at the prime mover 110, or for meeting high load demands placed on the prime mover 110 by the swing motor 112 and/or the actuators 118-122, the second clutch 146 can be operated to couple the second shaft 144, that is associated with the prime mover 110, to the second intermediary shaft 154. Upon coupling the second shaft 144 to the second intermediary shaft 154, drive power stored at the flywheel 136 can be routed to the second shaft 144 and used to supplement the power output of the prime mover 110, for example, in driving the actuators 118-122 and/or the swing motor 112, for instance, during periods of high load demand, or for reducing fuel consumption by the prime mover 110 as disclosed earlier herein.

In embodiments of this disclosure, it is further contemplated that if the first and second clutches 138, 146 are in their engaged positions, i.e., the first intermediary shaft 140 is locked-up with the first shaft 134 and the second shaft 144 is locked-up with the second intermediary shaft 154, then not only drive power that is stored in the flywheel 136, but also incoming drive power from an ongoing rotation of the first shaft 134 would be transferred to the second shaft 144 thereby continuously and directly delivering drive power from the hydraulic motor/pump 126 to the prime mover 110.

When not in use, the flywheel 136 of the KERS 102 system can be disengaged from each of the hydraulic motor/pump 126 and the prime mover 110 by merely disengaging the first and second clutches 138, 146 so that a lossless connection is rendered between the hydraulic motor/pump 126 and the prime mover 110. In this lossless connection, drive power from the hydraulic motor/pump 126 is neither received from the hydraulic motor/pump 126 for storage at the flywheel 136 nor transferred from the flywheel 136 to the second shaft 144 of the prime mover 110.

Therefore, when disengaged from the hydraulic motor pump 126 and the prime mover 110, the KERS 102 of the present disclosure can also help the hydraulic motor/pump 126 and the prime mover 110 prevent any parasitic losses of drive power.

Figure 2:
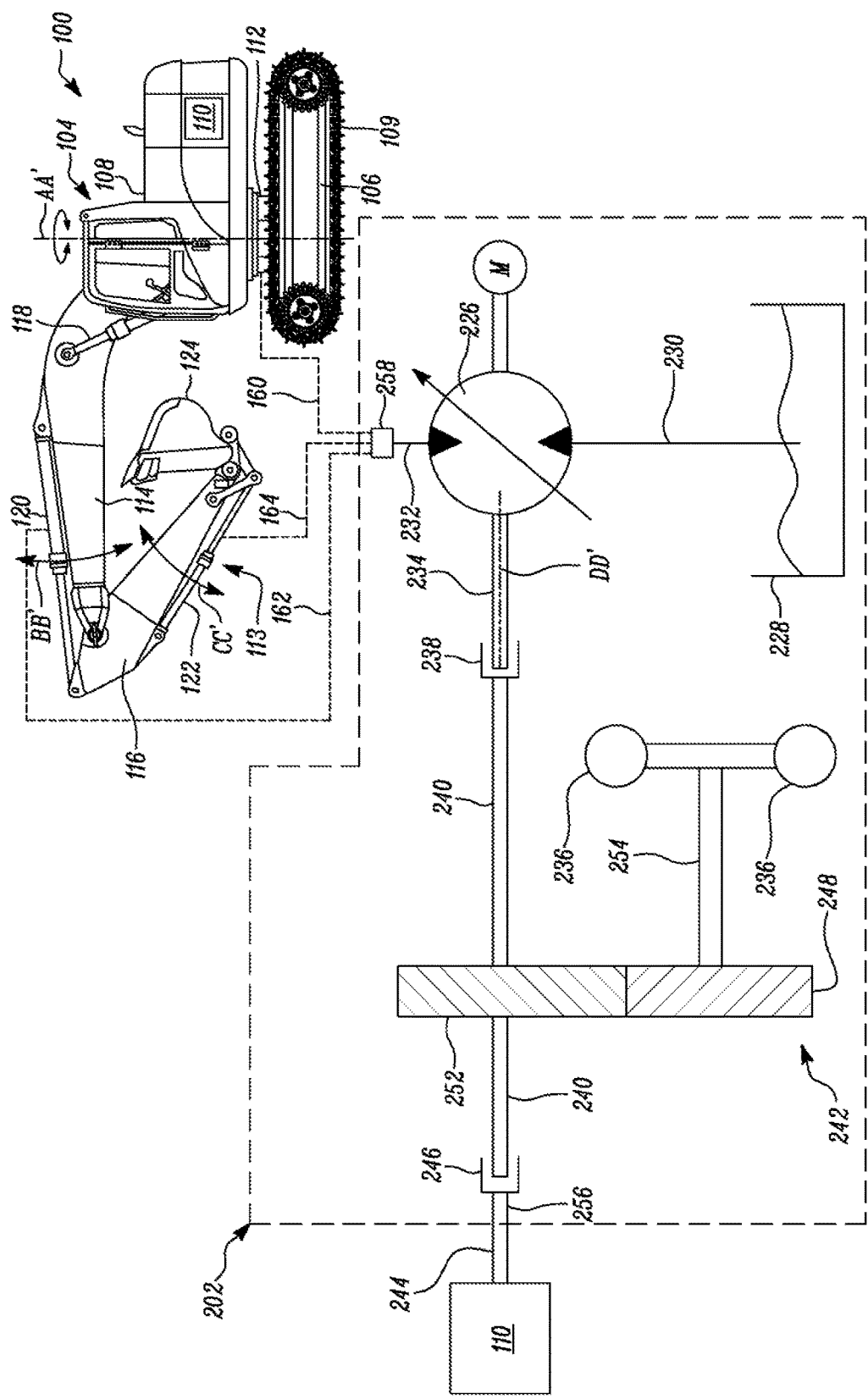
FIG. 2 is a side diagrammatic view of the machine showing a schematic of a kinetic energy recovery system (KERS) that can be employed by the machine, in accordance with another embodiment of the present disclosure.

Referring to another embodiment shown in FIG. 2, the KERS 202 includes a gearing arrangement 242 that is configured to selectively couple with the first shaft 234 of the hydraulic motor/pump 226 with the help of a first clutch 238, and a flywheel 236 that is coupled to the gearing arrangement 242. The first clutch 238 is selectively operable for facilitating a transfer of drive power from the first shaft 234 of the hydraulic motor/pump 226 to the flywheel 236 via the gearing arrangement 242. As with the embodiment of FIG. 1, the flywheel 236, in this embodiment, is configured to likewise store drive power generated by the hydraulic motor/pump 226 from the return flow of fluid when the first clutch 238 couples the gearing arrangement 242 with the first shaft 234 of the hydraulic motor/pump 226.

Furthermore, the KERS 202 also includes a second clutch 246 disposed between the gearing arrangement 242 and a second shaft 244 associated with the prime mover 110 of the machine 100 for selectively coupling the gearing arrangement 242 with the second shaft 244. The second clutch 246 is selectively operable for transferring stored drive power from the flywheel 236 to the second shaft 244 via the gearing arrangement 242.

In this embodiment, the gearing arrangement 242 includes a first gear wheel 248 rigidly mounted on a first intermediary shaft 240 that is co-located with each of the first shaft 234 and the second shaft 244. The first intermediary shaft 240 is selectively engageable to the first shaft 234 with the help of the first clutch 238 and is selectively engageable to the second shaft 244 with the help of the second clutch 246. Further, as shown, the gearing arrangement 242 also includes a second gear wheel 252 that is disposed in rotatable engagement with the first gear wheel 248 and rigidly mounted on the second intermediary shaft 254.

Furthermore, the flywheel 236 is mounted at an end of the second intermediary shaft 254 while an end 256 of the second shaft 244 is configured to support, at least in part, the second clutch 246 thereon. In this embodiment, the second clutch 246 is selectively operable to couple the second shaft 244 with the first intermediary shaft 240.

A working of the KERS 202 from the illustrated embodiment of FIG. 2 via selective and independent operation of the first and second clutches 238, 246 is analogous to that described for the KERS 102 from the illustrated embodiment of FIG. 1. It may be noted that one of the two configurations of the KERS 102/202 from the illustrated embodiments of FIGS. 1 and 2 may be suitably selected for implementation in the machine 100 depending on various factors and specific requirements of an application including, but not limited to, space constraints encountered in a given type of machine.

Moreover, in embodiments of this disclosure, it may be noted that although a single KERS 102/202 is used, two or more KERS 102/202 can be employed in a single machine depending on specific requirements of an application. As such, it may be possible that in some types or configurations of machines known to persons skilled in the art, the machine may include more than one prime mover therein, and such multiple prime movers may be independently associated with corresponding KERS 102/202 without deviating from the scope of the appended claims.

Various embodiments disclosed herein are to be taken in the illustrative and explanatory sense, and should in no way be construed as limiting of the present disclosure. All joinder references (e.g., attached, affixed, coupled, engaged, meshed, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to or over another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for use and implementation in recovering drive power from a hydraulic motor/pump of a machine when fluid flow is returned to a fluid source via the hydraulic motor/pump. This recovered drive power may be used to supplement the power output from a prime mover in moving various actuators or driving swing motors associated with the machine. The recovered drive power used to supplement the power output of a given prime mover can, for instance, reduce a rate of fuel consumption by the prime mover. In another instance, the recovered drive power may, additionally or optionally, be used to supplement the power output of a given prime mover during periods of high load demand on the prime mover.

It is hereby envisioned that with implementation of the KERS 102/202 from embodiments disclosed herein, an amount of fuel required by the prime mover of a machine to facilitate cyclical start-stop movements and operation of high inertia components such as linkages and/or the body relative to the frame can be reduced. Therefore, machines typically provided with linkages and/or a swiveling body mounted on top of a frame can beneficially operate the associated prime mover with a reduced amount of fuel consumption per unit time as opposed to previously known configurations of machines that were not implemented with the KERS 102/202 disclosed herein.

Moreover, in many earlier cases, machines were typically provided with one or more accumulators to store fluid under pressure. However, the use of these accumulators could be expensive as compared to the KERS 102/202 disclosed herein as such accumulators would need frequent monitoring, maintenance, and have a finite amount of service life owing to its nature of operation and/or other system design limitations. Therefore, implementation of the KERS 102/

202 disclosed herein may help users of machines to offset costs that were previously incurred with use of accumulators.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A kinetic energy recovery system (KERS) for a machine having a prime mover, a swing motor and an actuator therein, the KERS comprising:
   a KERS selection valve fluidly connected to a hydraulic motor/pump via a hydraulic motor/pump conduit, the KERS selection valve operated to:
   selectively receive hydraulic energy from the swing motor via a swing-motor conduit and the actuator via an actuator conduit, the actuator conduit being separate from the swing-motor conduit, when the hydraulic motor/pump is actuated as a hydraulic motor; and
   selectively supply hydraulic energy to the swing motor via the swing-motor conduit and to the actuator via the actuator conduit when the hydraulic motor/pump is actuated as a hydraulic pump;
   the hydraulic motor/pump disposed in fluid communication with a fluid source via a fluid source conduit, the hydraulic motor/pump configured to output pressurized fluid via the hydraulic motor/pump conduit to the KERS selection valve for selectively operating the swing motor or the actuator based on the selective operation of the KERS selection valve, wherein a first shaft operably and mechanically attached to the hydraulic motor/pump is configured to be operatively rotated by a flow of fluid returning, via the KERS selection valve, from the swing motor or the actuator back to the fluid source via the hydraulic motor/pump;
   a flywheel configured to selectively couple with the first shaft of the hydraulic motor/pump with the help of a first clutch, the flywheel configured to store drive power generated by the hydraulic motor/pump from the return flow of fluid when the first clutch couples the flywheel with the first shaft of the hydraulic motor/pump; and
   a gearing arrangement coupled to the flywheel and configured to selectively engage with a second shaft associated with the prime mover of the machine, the gearing arrangement being selectively engaged to the second shaft with the help of a second clutch, wherein the first clutch is selectively operable for facilitating a transfer of drive power from the first shaft of the hydraulic motor/pump to the flywheel, and wherein the second clutch is selectively operable for transferring stored drive power from the flywheel to the second shaft associated with the prime mover.

2. The KERS of claim 1, wherein the flywheel is mounted on a first intermediary shaft that is co-located with the first shaft and configured to support, at least in part, the first clutch thereon.

3. The KERS of claim 2, wherein the gearing arrangement includes:
   a first gear wheel rigidly mounted to an end of the first intermediary shaft; and
   a second gear wheel disposed in rotatable engagement with the first gear wheel, the second gear wheel mounted on a second intermediary shaft co-located with the second shaft associated with the prime mover.

4. The KERS of claim 3, wherein an end of the second shaft is configured to support, at least in part, the second clutch thereon.

5. The KERS of claim 4, wherein the second clutch is selectively operable to couple the second shaft with the second intermediary shaft.

6. The KERS of claim 1, wherein the first clutch and the second clutch are operable independently of one another.

7. The KERS of claim 1, wherein the hydraulic motor/pump conduit associated with the hydraulic motor/pump is configured to allow the fluid to return from each of: the swing motor and the actuator to the hydraulic motor/pump.

8. A kinetic energy recovery system (KERS) for a machine having a prime mover, and a swing motor and an actuator therein, the KERS comprising:
   a KERS selection valve fluidly connected to a hydraulic motor/pump via a hydraulic motor/pump conduit, the KERS selection valve operated to:
   selectively receive hydraulic energy from the swing motor via a swing-motor conduit and the actuator via an actuator conduit, the actuator conduit being separate from the swing-motor conduit, when the hydraulic motor/pump is actuated as a hydraulic motor; and
   selectively supply hydraulic energy to the swing motor via the swing-motor conduit and to the actuator via the actuator conduit when the hydraulic motor/pump is actuated as a hydraulic pump;
   the hydraulic motor/pump disposed in fluid communication with a fluid source via a fluid source conduit, the hydraulic motor/pump configured to output pressurized fluid via the hydraulic motor/pump conduit to the KERS selection valve for selectively operating the swing motor or the actuator based on the selective operation of the KERS selection valve, wherein a first shaft operably and mechanically attached to the hydraulic motor/pump is configured to be operatively rotated by a flow of fluid returning, via the KERS selection valve, from the swing motor or the actuator back to the fluid source via the hydraulic motor/pump;
   a gearing arrangement configured to selectively couple with the first shaft of the hydraulic motor/pump with the help of a first clutch, and
   a flywheel coupled to the gearing arrangement, the flywheel configured to store drive power generated by the hydraulic motor/pump from the return flow of fluid when the first clutch couples the gearing arrangement with the first shaft of the hydraulic motor/pump; and
   a second clutch disposed between the gearing arrangement and a second shaft associated with the prime mover of the machine, the second clutch configured to selectively couple the gearing arrangement with the second shaft, wherein the first clutch is selectively operable for facilitating a transfer of drive power from the first shaft of the hydraulic motor/pump to the flywheel via the gearing arrangement, and wherein the second clutch is selectively operable for transferring stored drive power from the flywheel to the second shaft via the gearing arrangement.

9. The KERS of claim 8, wherein the gearing arrangement includes:
   a first gear wheel rigidly mounted on a first intermediary shaft co-located with each of the first shaft associated with the hydraulic motor/pump and the second shaft associated with the prime mover, wherein the first intermediary shaft is selectively engageable to the first shaft with the help of the first clutch and is selectively engageable to the second shaft with the help of the second clutch; and
a second gear wheel disposed in rotatable engagement with the first gear wheel, the second gear wheel mounted on a second intermediary shaft.

10. The KERS of claim 9, wherein the flywheel is mounted at an end of the second intermediary shaft.

11. The KERS of claim 10, wherein an end of the second shaft is configured to support, at least in part, the second clutch thereon.

12. The KERS of claim 11, wherein the second clutch is selectively operable to couple the second shaft with the second intermediary shaft.

13. The KERS of claim 8, wherein the first clutch and the second clutch are operable independently of one another.

14. The KERS of claim 8, wherein the hydraulic motor/pump conduit associated with the hydraulic motor/pump is configured to allow the fluid to return from each of: the swing motor and the actuator to the hydraulic motor/pump.

15. A machine comprising:
a frame;
a body mounted on the frame and having a prime mover disposed therein;
a swing motor configured to operably rotate the body relative to the frame;
a linkage pivotally mounted on the body;
an actuator configured to operably pivot the linkage relative to the body;
a kinetic energy recovery system (KERS) operable to selectively receive drive power from a hydraulic motor/pump disposed in fluid communication with the swing motor and the actuator of the machine, and selectively transfer stored drive power to the prime mover in driving the swing motor and the actuator, wherein the KERS includes:
a KERS selection valve fluidly connected to the hydraulic motor/pump via a hydraulic motor/pump conduit, the KERS selection valve operated to:
selectively receive hydraulic energy from the swing motor via a swing-motor conduit and the actuator via an actuator conduit, the actuator conduit being separate from the swing-motor conduit, when the hydraulic motor/pump is actuated as a hydraulic motor; and
selectively supply hydraulic energy to the swing motor via the swing-motor conduit and to the actuator via the actuator conduit when the hydraulic motor/pump is actuated as a hydraulic pump;
the hydraulic motor/pump being disposed in fluid communication with a fluid source via a fluid source conduit, the hydraulic motor/pump configured to output pressurized fluid via the hydraulic motor/pump conduit for operating the swing motor and the actuator based on the selective operation of the KERS selection valve, wherein a first shaft operably and mechanically attached to the hydraulic motor/pump is configured to be operatively rotated by a flow of fluid returning, via the KERS selection valve, at least one of: the swing motor and the actuator back to the fluid source via the hydraulic motor/pump;
a flywheel configured to selectively couple with the first shaft of the hydraulic motor/pump with the help of a first clutch, the flywheel configured to store drive power generated by the hydraulic motor/pump from the return flow of fluid when the first clutch couples the flywheel with the first shaft of the hydraulic motor/pump; and
a gearing arrangement coupled to the flywheel and configured to selectively engage with a second shaft associated with the prime mover of the machine, the gearing arrangement being selectively engaged to the second shaft with the help of a second clutch, wherein the first clutch is selectively operable for facilitating a transfer of drive power from the first shaft of the hydraulic motor/pump to the flywheel, and wherein the second clutch is selectively operable for transferring stored drive power from the flywheel to the second shaft associated with the prime mover.

16. The machine of claim 15, wherein the flywheel is mounted on a first intermediary shaft that is co-located with the first shaft and configured to support, at least in part, the first clutch thereon.

17. The machine of claim 16, wherein the gearing arrangement includes:
a first gear wheel rigidly mounted to an end of the first intermediary shaft; and
a second gear wheel disposed in rotatable engagement with the first gear wheel, the second gear wheel mounted on a second intermediary shaft co-located with the second shaft associated with the prime mover.

18. The machine of claim 17, wherein an end of the second shaft is configured to support, at least in part, the second clutch thereon, and wherein the second clutch is selectively operable to couple the second shaft with the second intermediary shaft.

19. The machine of claim 15, wherein the first clutch and the second clutch are operable independently of one another.

* * * * *